United States Patent [19]
Kondo

[11] 3,903,466
[45] Sept. 2, 1975

[54] CONTROL DEVICES OF ELECTRIC MOTORS FOR DRIVING PHOTOGRAPHIC CAMERAS

[75] Inventor: Isao Kondo, Hachioji, Japan

[73] Assignee: Olympus Optical Co., Ltd., Tokyo, Japan

[22] Filed: Sept. 6, 1973

[21] Appl. No.: 394,681

[30] Foreign Application Priority Data
Sept. 9, 1972  Japan............................... 47-90593
Sept. 14, 1972  Japan............................... 47-92513

[52] U.S. Cl. ............... 318/443; 318/446; 318/484; 354/213
[51] Int. Cl.² .......................................... H02P 1/10
[58] Field of Search ........... 318/446, 443, 444, 484; 354/213, 214

[56] References Cited
UNITED STATES PATENTS

| | | |
|---|---|---|
| 3,064,522 | 11/1962 | Fukuoka........................ 318/446 X |
| 3,262,042 | 7/1966 | Amos................................ 318/443 |
| 3,598,034 | 8/1971 | Suzuki .............................. 354/213 |
| 3,676,759 | 7/1972 | Mayr............................... 318/446 |
| 3,705,338 | 12/1972 | Tsujimoto et al................. 318/446 |

Primary Examiner—Benjamin Dobeck
Attorney, Agent, or Firm—Flynn & Frishauf

[57] ABSTRACT

The control device comprises an operating switch, a switching circuit responsive to the closure of the operating switch for changing its state, relay means responsive to the change in the state of the switching circuit, a release motor circuit connected to be closed when the relay means is operated for operating the release, and switch means for establishing a motor circuit for winding-up the photographic film when the release operation is completed and for applying a trigger signal to the switching circuit whereby the release and winding-up operations can be completed while the operating switch is held in its closed state.

14 Claims, 5 Drawing Figures

CONTROL DEVICES OF ELECTRIC MOTORS FOR DRIVING PHOTOGRAPHIC CAMERAS

BACKGROUND OF THE INVENTION

This invention relates to a control device of an electric motor for driving a photographic camera.

A prior art control device of a motor for driving a photographic camera is constructed such that when an operating button is depressed, a release mechanism is operated by the torque of the motor, and that when the operating button is released a film winding-up mechanism is actuated by the torque of the motor. In such a motor drive control device, since the film winding-up mechanism begins to operate when the operating button is released, it is not permissible to press again the operating button immediately after its release. Furthermore, the photographic film is not brought standstill at once after the film has been wound-up so that it is necessary to retard the operation of the shutter until the film is brought to a perfect standstill state. For this reason, a good chance of operating the shutter is lost thus leading to inconvenience of the use of the camera.

SUMMARY OF THE INVENTION

It is an object of this invention to provide an improved control device for a motor for driving a photographic camera in which the release mechanism and the film winding-up mechanism are operated quickly in succession while the operating button is being depressed.

Another object of this invention is to provide a novel control device of an electric motor for a photographic camera which permits continuous photographing with a definite interval.

According to this invention, there is provided a control device of an electric motor for driving a photographic camera which comprises a switching circuit responsive to the closure of the operating switch, relay means responsive to the closure of the switching circuit for connecting the motor in a release operating circuit, and motor driven switch means interlocked with the motor for switching the connection of the motor from the release operating circuit to the film winding-up operating circuit when the releasing operation is completed and for applying to the switching circuit a signal for operating the same, thereby completing the releasing operation and the film winding-up operation while the operating switch is maintained in its operated condition.

DESCRIPTION OF THE PREFERRED EMBODIMENTS

Figure 1:
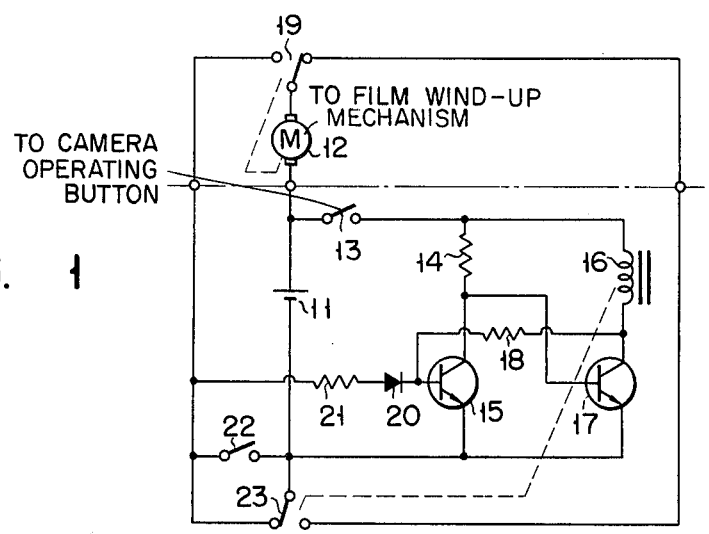
FIG. 1 shows a connection diagram of one embodiment of the motor drive control device embodying the invention.

In the embodiment shown in FIG. 1, one pole of a DC source 11, shown as a battery, is connected to one terminal of an electric motor 12 and to the movable contact of an operating switch 13. The stationary contact of the switch 13 is connected to the collector electrode of a transistor 15 via a resistor 14 and to the collector electrode of a transistor 17 via a relay coil 16. The base electrode of transistor 17 is connected to the collector electrode of transistor 15, whereas the base electrode of transistor 15 is connected to the collector electrode of transistor 17 via a resistor 18. The emitter electrodes of transistors 15 and 17 are connected to the other pole of the source 11. The transistor circuit shown in FIG. 1 constitutes a switching circuit. The movable contact of a transfer switch 23 operated by the relay coil 16 is connected to said other pole of the source 11. The other terminal of motor 12 is connected to the movable contact of a transfer switch 19 which is interlocked with the motor. The normally closed contact (righthand contact) of transfer switch 19 is connected to the normally open contact (righthand contact) of transfer switch 23 to complete a circuit for motor 12 for release operation (hereinafter called a "release motor circuit") while the normally open contact (lefthand contact) of the transfer switch 19 is connected to the normally closed contact (lefthand contact) of the transfer switch 23 to complete a circuit for the motor 12 for the film winding-up operation (hereinafter called a "winding-up motor circuit"). The normally open contact (lefthand contact) of transfer switch 19 is connected to the base electrode of transistor 15 through a diode 20, poled as shown, and a resistor 21, which are connected in series for supplying a trigger voltage to the switching circuit comprised by transistors 15 and 17. A continuous photographing switch 22 is connected between the normally closed contact and the movable contact of the transfer switch 23.

The motor drive control device shown in FIG. 1 operates as follows:

When the operating switch 13 is closed by depressing an operating button, not shown, transistor 17 is rendered ON whereas transistor 15 is rendered OFF. When transistor 17 is rendered ON the relay 16 is energized to switch the transfer switch 23 for closing its normally open contact. As a consequence, the release motor circuit is formed to rotate the motor 12 for operating a release mechanism, not shown. Upon completion of the operation of the release mechanism, transfer switch 19 is transferred to the normally open contact to apply a trigger signal to the base electrode of transistor 15, thus turning ON the same and turning OFF transistor 17. Consequently, relay 16 is de-energized so that transfer switch 23 is transferred to the normally closed contact. Closure of the normally closed contact closes the winding-up motor circuit to wind-up the film. When the normally closed contact of the transfer switch 23 is closed, the base and emitter electrodes of transistor 15 will be short circuited. However, under these conditions, the base electrode of transistor 15 is applied with a positive bias voltage through resistor 18. Upon completion of the film winding-up operation the transfer switch 19 will be transferred to the side of the release motor circuit, that is to the normally closed contact.

Operations described above, that is the release and film winding-up operations are performed while the operating button is held in its depressed position. At the time when the operating button is released, vibrations of the camera and the film surface will be ceased completely so that the motor drive control device will be in a condition in which the motor drive control device can operate at once. For this reason, it is possible to take a photograph by depressing the operating button immediately after its release. When the base and emitter electrodes of transistor 15 are short circuited by closing the continuous photographing switch 22, even when the transfer switch 19 is transferred to its normally open contact any trigger signal will not be applied to the base electrode of transistor 15 so that this transistor will be maintained in its OFF state and the energization of relay 16 will be continued. Accordingly, so long as the operating switch 13 is maintained in its closed state, the release and the film winding-up operations are performed continuously so that it is possible to photograph continuously during one cycle of operations (about one-fourth second) of the motor drive control device.

Figure 2:
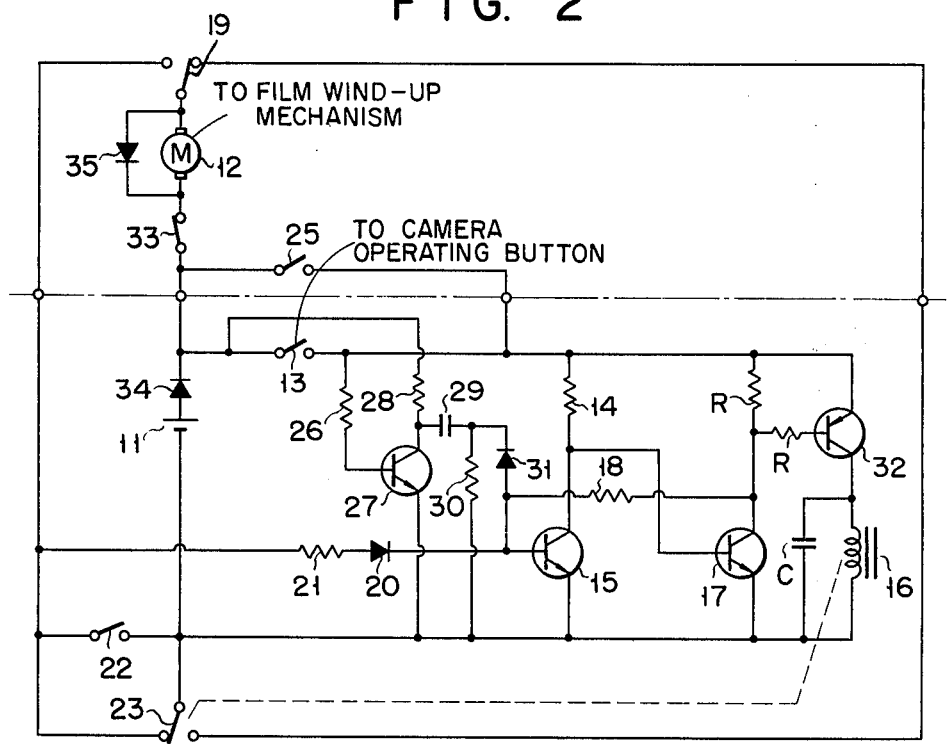
FIG. 2 shows a connection diagram of a modified embodiment of this invention.

In a modified embodiment shown in FIG. 2, when the operating switch 13 or 25 is closed, the base electrode of an NPN transistor 27 is impressed with a positive bias potential via a resistor 26 whereby transistor 27 is turned ON, and a capacitor 29 is discharged through the collector emitter path of the transistor 27 and a resistor 30. This discharge of capacitor 29 applies a negative bias potential upon the base electrode of an NPN transistor 15 via a diode 31 thereby turning OFF transistor 15. On the other hand, an NPN transistor 17 is turned ON which in turn renders ON a PNP trnasistor 32. As a result, relay 16 is energized to transfer the transfer switch 23 to the normal circuit. Consequently, motor 12 rotates to operate the release mechanism. Remaining elements shown in FIG. 2 are identical to those shown in FIG. 1 and operate similarly. Thus, while the operating button is being depressed, it is possible to quickly perform the releasing and winding-up operations.

A synchronizing switch 33, operating in synchronism with the operation of the shutter, is connected between the source 11 and the motor 12. The synchronizing switch 33 is constructed and arranged such that it is opened when the shutter is opened and is closed when the shutter is closed. For example, in the case of a single lens reflex camera, if the synchronizing switch 33 is arranged such that it is opened when the reflecting mirror of the camera is raised, and closed when the mirror is lowered, it would be possible to eliminate an undesirable condition in which the film winding-up mechanism happens to operate during the operation of the shutter even when the shutter speed is low. The purpose of providing a diode 34 is to prevent a reverse current flow to the source, whereas a diode 35 is connected in parallel with the motor for protecting the same. The operating switch 13 is mounted on the housing (not shown) of the source, while the operating switch 25 is mounted on the motor housing (not shown), so as to make it possible to actuate the motor drive device by closing either one of them.

Figure 3:
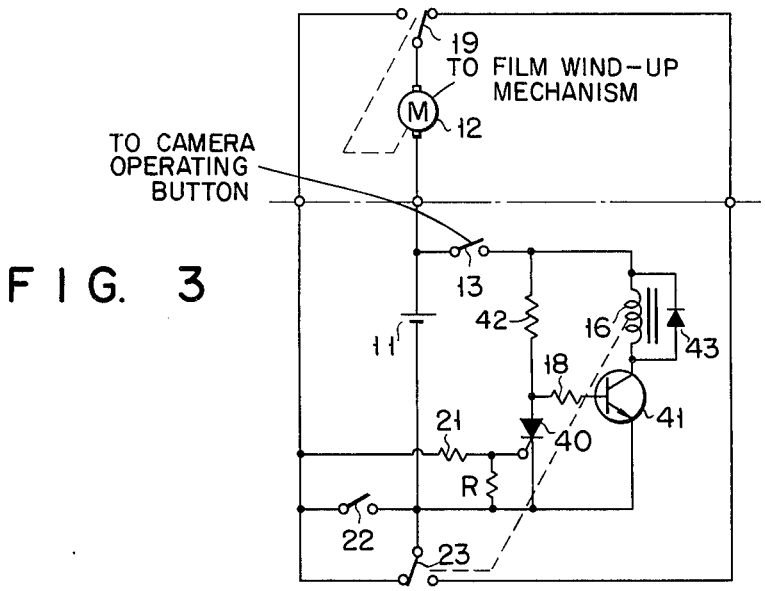
FIG. 3 shows a connection diagram of another modification wherein a silicon controlled rectifier element is used in the switching circuit.

In another embodiment shown in FIG. 3, a silicon controlled rectifier element is used to construct the control circuit for the motor drive.

In this embodiment, since a silicon controlled rectifier element 40 is normally held nonconductive, upon closure of the operating switch 13 a positive potential is impressed upon the base electrode of transistor 41 via a resistor 42. Consequently, transistor 41 is turned ON to energize relay 16 to transfer the transfer switch 23 to the normally open contact thus completing the release motor circuit. Thus, motor 12 operates the release mechanism. After completion of the operation of the release mechanism, switch 19 is transferred to the lefthand contact to complete the film winding-up circuit. Then, a gating current is applied to the gate electrode of the silicon controlled rectifier element 40 via resistor 21 thus rendering the same conductive. Then transistor 41 is turned OFF to de-energize relay 16. The transfer switch 23 is transferred to the normally closed contact to form the film winding-up circuit whereby the motor 12 is energized to wind-up the film. When the operating switch 13 is opened, the silicon controlled rectifier element 40 is de-energized, thus restoring the original condition.

When switch 22 is closed, no gating current to supplied to the gate electrode of the silicon controlled rectifier element 40 thus turning it OFF, so that so long as the operating switch 13 is maintained closed countinuous photographing is possible.

With the circuit arrangements described above, where photographs are taken continuously with the operating button maintained in its closed condition, the interval of photographing is determined by the inherent operating time of the motor drive device so that it is impossible to set the interval at any desired value. In the following embodiments, this object is accomplished by incorporating a delay circuit into the switching circuit of the motor drive control device.

Figure 4:
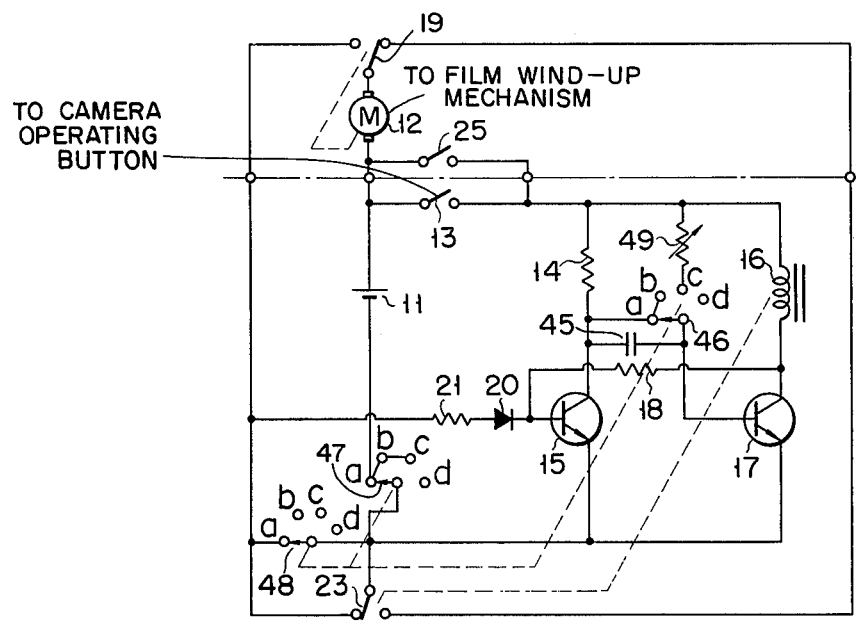
FIG. 4 shows a connection diagram of another modification wherein a delay circuit is used in the switching circuit shown in FIG. 1.

More particularly, in the embodiment shown in FIG. 4, the base electrode of transistor 17 of the switching circuit is connected to the collector electrode of transistor 15 through a capacitor 45 and to the movable contact of a multi-position transfer switch 46. The stationary contact *a* of the switch 46 is connected to the collector electrode of transistor 15 and to the stationary contact *b* of the switch 46, whereas the stationary contact *c* is connected to the operating switches 13 and 25 through a variable resistor 49. Another multi-position transfer switch 47 is connected between the source 11 and the movable contact of the transfer switch 23 operated by the relay, the stationary contacts *a*, *b*, and *c* of the transfer switch 47 being connected in common. Still another multiposition transfer switch 48 is connected between the movable contact of the transfer switch 23 and its normally closed contact. It is to be understood that transfer switches 46, 47 and 48 are interlocked with each other. With this arrangement when transfer switches 46, 47 and 48 are thrown to their stationary contacts *a* the control circuit shown in FIG. 4 assumes the same state as that of the circuit shown in FIG. 1 wherein switch 22 is closed. When the transfer switches are thrown to their contacts *b* the control circuit shown in FIG. 4 assumes the same state as that of the circuit shown in FIG. 1 in which one picture has been photographed, that is the switch 22 shown in FIG. 1 has been opened. When the transfer switches 46, 47 and 48 are thrown to their contacts *c*, the delay circuit is connected to the switching circuit. When the operating switch 13 or 25 is closed under these conditions, transistor 17 is turned ON whereas transistor 15 is turned OFF, thereby operating relay 16 to actuate the release mechanism. When the transfer switch 19 is thrown to the lefthand or winding-up side, transistor 15 is turned ON whereas transistor 17 OFF. Consequently, relay 16 is de-energized to wind-up the film. Under these conditions, capacitor 45 is charged by a current flowing through variable resistor 49 to a predetermined potential with a time delay corresponding to the time constant determined by the values of the capacitor 45 and variable resistor 49. As the potential across capacitor 45 reaches a value sufficiently large to turn ON transistor 17, the relay 16 is energized again to operate the release mechanism.

As has been described hereinabove, when the transfer switches are thrown to their contacts c, it is possible to photograph continuously with an interval or time delay corresponding to the time constant of the CR circuit, and to select any desired interval by adjusting the variable resistor 49.

Figure 5:
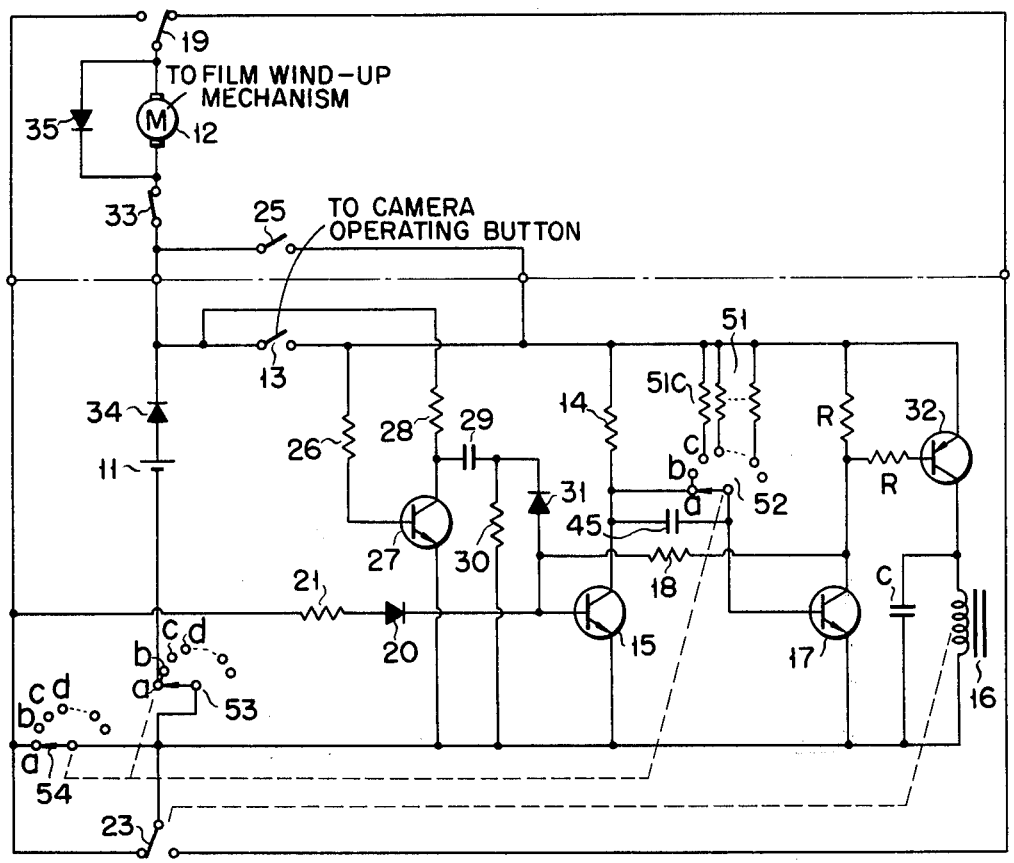
FIG. 5 shows still further modification of the invention wherein a delay circuit is provided for the circuit shown in FIG. 2.

The modified embodiment shown in FIG. 5 is similar to that shown in FIG. 2 except that a delay circuit is used and that the variable resistor 49 shown in FIG. 4 is substituted by a plurality of resistors 51 having different values and connected to respective stationary contacts of a multiposition transfer switch 52.

In this embodiment, when either one of the operating switches 13 and 25 is closed while the transfer switches 52, 53 and 54 are thrown to their stationary contacts c, transistor 27 is turned ON whereby transistor 15 is turned OFF, and transistor 17 ON. Consequently, a PNP transistor 32 is turned ON to energize relay 16. When the operation of the release mechanism is completed and the transfer switch 19 is thrown to the wind-up side, transistor 15 is turned ON which in turn turns OFF transistor 17. Accordingly, relay 16 is de-energized to operate the winding-up mechanism. Under these conditions, capacitor 45 is charged to a predetermined potential by a current flowing through resistor 51c connected to the stationary contact c of the transfer switch 52 with a time delay corresponding to the time constant determined by the value of capacitor 45 and resistor 51c. When the potential across capacitor 45 reaches a value sufficient to turn ON transistor 17, transistor 32 is turned ON whereby the relay 16 is energized again to operate the release mechanism.

In this manner, it is possible to photograph successively a number of pictures with a predetermined time delay or interval while the operating button is being depressed. Any desired time delay may be set by switching the transfer switch 52 to any one of its stationary contacts c, d and e.

What is claimed is:

1. A motor drive device for a still camera having film wind-up means which includes a film wind-up circuit and shutter operating means which includes a shutter release circuit, comprising:
    an electric motor coupled to said film wind-up means for effecting a film winding-up operation and coupled to said shutter operating means for effecting a shutter releasing operation;
    operating switch means coupled to said motor to operate said motor drive device;
    a switching circuit coupled to said operating switch means and being operative in response to the operation of said operating switch means;
    relay means coupled to said switching circuit and energized in response to the operation of said switching circuit to operatively connect said motor to said shutter release circuit while said operating switch means is maintained in its operated condition; and
    a motor driven switch means coupled to and driven by said motor for switching the connection of said motor from said shutter release circuit to said film winding-up circuit when the shutter releasing operation is completed and while said operating switch means is maintained in its operated condition and for supplying a trigger signal to said switching circuit to open said switching circuit when the shutter releasing operation is completed, said switching circuit being coupled to said operating switch means and to said motor driven switch means such that said switching circuit is opened responsive to said trigger signal even when said operating switch means is maintained in its operated condition.

2. The motor drive device according to claim 1 including a source of power, and wherein said motor has one terminal connected to one pole of said source and the other terminal connected to said operating switch means, said switching circuit comprising first and second transistors, the collector electrode of said first transistor being connected to said one pole of said source via a first resistor and said operating switch means, and to the base electrode of said second transistor, the collector electrode of said second transistor being connected to said one pole of said source through said relay means and said operating switch means and to the base electrode of said first transistor through a second resistor, the base electrodes of said first and second transistors being connected to the other pole of said source, and said relay means including a transfer switch means including a first contact connected to said motor driven switch means for completing a connection of said motor to said shutter release circuit and a second contact for completing a connection of said motor to said film winding-up circuit.

3. The control device according to claim 1 including a source of power, and wherein said relay means includes a transfer switch having a pair of contacts and said motor driven switch means includes a pair of contacts, said connection to said shutter release circuit comprises a series circuit including said source, said motor, one contact of said motor driven switch means, and one contact of said transfer switch, and said circuit for completing said connection for winding-up the film comprises a series circuit including said source, said motor, the other contact of said motor driven switch means and the other contact of said transfer switch.

4. The control device according to claim 1 wherein said switching circuit comprises a first transistor circuit connected to said operating switch means, a second transistor circuit which is turned OFF in response to the operation of said first transistor circuit, a third transistor circuit which is turned ON when said second transistor circuit is in its OFF state, a fourth transistor circuit which is turned ON when said third transistor circuit is in its ON state for energizing said relay means, and including means responsive to the operation of said motor driven switch for applying a trigger signal to said second transistor circuit.

5. The control device according to claim 3 wherein a switch operated in synchronism with the shutter speed is connected between said motor and said source.

6. The control device according to claim 1 wherein said switching circuit comprises a first transistor circuit connected to said operating switch means so as to be turned ON when said operating switch means is closed for operating said relay means, and a silicon controlled rectifier element which is connected to be turned ON by a said trigger signal generated by the operation of said motor driven switch means thereby turning OFF said first transistor circuit.

7. A motor drive device for a still camera having film wind-up means which includes a film wind-up circuit and shutter operating means which includes a shutter release circuit, comprising:

an electric motor coupled to said film wind-up means for effecting a film winding-up operation and coupled to said shutter operating means for effecting a shutter releasing operation;

operating switch means coupled to said motor to operate said motor drive device;

a switching circuit coupled to said operating switch means and being operative in response to the operation of said operating switch means;

relay means coupled to said switching circuit and energized in response to the operation of said switching circuit to operatively connect said motor to said shutter release circuit while said operating switch means is maintained in its operated condition;

a motor driven switch means coupled to and driven by said motor for switching the connection of said motor from said shutter release circuit to said film winding-up circuit when the shutter relasing operation is completed and while said operating switch means is maintained in its operated condition and for supplying a trigger signal to said switching circuit to open said switching circuit when the shutter releasing operation is completed; and a delay circuit selectively coupled to said switching circuit to delay successive operations thereof so as to substantially continuously perform successive photographing operations with a desired delay time between said successive photographing operations when said operating switch means is continuously maintained in its operated condition.

8. The motor drive device according to claim 7 wherein said switching circuit comprises a first transistor circuit connected to said operating switch means, a second transistor circuit connected to be turned OFF in response to the operation of said first transistor circuit, a third transistor circuit connected to be turned ON when said second transistor circuit is turned OFF, a fourth transistor circuit connected to be turned ON when said third transistor circuit is turned ON for energizing said relay means.

9. The motor drive device according to claim 8 wherein said delay circuit comprises a capacitor serially connected to said second transistor and a plurality of resistors selectively series-connected to said capacitor so that said capacitor is charged in accordance with a time constant of said capacitor and the selected one of said resistors when said second transistor is turned ON.

10. The motor drive device according to claim 9 wherein said switching circuit includes switch means for selectively short circuiting said capacitor and for selectively series-connecting a desired one of said first resistors to said capacitor.

11. The motor drive device according to claim 7 wherein said switching circuit comprises a first transistor circuit connected to said operating switch means so as to be turned ON when said operating switch means is closed, thereby energizing said relay means, and a second transistor circuit connected to be turned ON in response to said trigger signal which is generated when said motor driven switch is operated to establish said connection to said film winding-up circuit.

12. The motor drive device according to claim 11 wherein said delay circuit comprises an RC circuit including a resistor and a capacitor which are connected serially to said first transistor so that said capacitor is charged in accordance with a time constant of the RC circuit when said first transistor is turned ON.

13. The motor drive device according to claim 12 wherein said switching circuit includes a switch for selectively short circuiting said capacitor.

14. The motor drive device according to claim 12 wherein said first resistor of said switching circuit comprises a variable resistor.

\* \* \* \* \*